(12) United States Patent
Usui et al.

(10) Patent No.: US 7,639,516 B2
(45) Date of Patent: Dec. 29, 2009

(54) SWITCHING POWER SOURCE DEVICE

(75) Inventors: Hiroshi Usui, Niiza (JP); Tomoyasu Yamada, Niiza (JP); Masaaki Shimada, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 0 days.

(21) Appl. No.: 11/284,986

(22) Filed: Nov. 21, 2005

(65) Prior Publication Data

US 2006/0109692 A1 May 25, 2006

(30) Foreign Application Priority Data

Nov. 19, 2004 (JP) .............................. 2004-336307

(51) Int. Cl.
*H02M 3/335* (2006.01)
(52) U.S. Cl. ...................... 363/21.12; 363/20
(58) Field of Classification Search .............. 363/20.01, 363/20, 20.02, 21.12, 21.13, 21.14, 21.15, 363/20.03, 20.04
See application file for complete search history.

(56) References Cited

U.S. PATENT DOCUMENTS

| | | | | |
|---|---|---|---|---|
| 5,999,421 A | * | 12/1999 | Liu | 363/21.15 |
| 6,163,142 A | * | 12/2000 | Tsujimoto | 323/283 |
| 6,252,783 B1 | * | 6/2001 | Huh et al. | 363/21.01 |
| 6,519,165 B2 | * | 2/2003 | Koike | 363/21.12 |
| 6,842,350 B2 | * | 1/2005 | Yamada et al. | 363/21.16 |
| 2005/0128773 A1 | * | 6/2005 | Yang et al. | 363/21.01 |
| 2006/0017426 A1 | * | 1/2006 | Yang et al. | 323/283 |
| 2006/0044845 A1 | * | 3/2006 | Fahlenkamp et al. | 363/21.15 |
| 2006/0098462 A1 | * | 5/2006 | Usui | 363/21.01 |

FOREIGN PATENT DOCUMENTS

| JP | 2002-171760 | 6/2002 |
|---|---|---|
| JP | 2002-171761 | 6/2002 |

* cited by examiner

*Primary Examiner*—Bao Q Vu
*Assistant Examiner*—Nguyen Tran
(74) *Attorney, Agent, or Firm*—Howard & Howard Attorneys PLLC

(57) ABSTRACT

The ON duration of an N channel MOS transistor is set based on a target voltage at a node between a resistor and a light receiving element of a photocoupler. A comparator compares the target voltage with a reference voltage at a node between a variable resistor and a resistor. A normal mode and a low frequency operation mode are switched from one to the other based on an output signal from the comparator. The resistance of the variable resistor becomes low when an input voltage from a power source is high. Even when the input voltage is high, therefore, the ON duration of the N channel MOS transistor at the transition between the normal mode and the low frequency operation mode becomes short. This reduces the switching energy in low frequency operation mode, thereby suppressing noise.

5 Claims, 8 Drawing Sheets

SWITCHING POWER SOURCE DEVICE

BACKGROUND OF THE INVENTION

1. Field of the Invention

The present invention relates to a switching power source device, and, more particularly, to a switching power source device which performs a switching operation according to the status of a load.

2. Description of the Related Art

A switching power source device performs a switching operation to store energy in an inductor, and supplies the stored energy to a load. Examples of a switching power source device which performs a switching operation according to the status of a load are disclosed in Unexamined Japanese Patent Application KOKAI Publication No. 2002-171760 and Unexamined Japanese Patent Application KOKAI Publication No. 2002-171761.

The switching power source device disclosed in Unexamined Japanese Patent Application KOKAI Publication No. 2002-171760 performs a switching operation intermittently when the load becomes light. The switching power source device disclosed in Unexamined Japanese Patent Application KOKAI Publication No. 2002-171761 has a low frequency operation mode to lower the switching frequency when the load becomes light.

FIG. 7 is a structural diagram showing one example of a conventional switching power source device having a low frequency operation mode.

This switching power source device sets a reset-set flip-flop (hereinafter simply called "flip-flop") 2 which is synchronous with the oscillation frequency of an oscillator (OSC) 1.

When the flip-flop 2 is set, a switching element 3 is switched on.

The ON action of the switching element 3 causes a switching current to flow to the primary winding of a transformer 4 from a power source 18, thus storing energy in the transformer 4.

A resistor 5 generates a voltage corresponding to the switching current.

A comparator 6 resets the flip-flop 2 when the voltage generated by the resistor 5 exceeds a target voltage Vm.

The target voltage Vm is a reference voltage ES1, generated by a reference voltage source 7, divided by the resistance of a resistor 8 and the resistance of a light receiving element 9 of a photocoupler.

When the flip-flop 2 is reset, the switching element 3 is switched off.

When the switching element 3 is switched off, the energy stored in the transformer 4 is supplied to a load by a diode 10 and a capacitor 11.

An output-voltage detection circuit 12 detects the difference between an output voltage and a predetermined value. A light emitting element 13 of the photocoupler emits light according to the difference.

The emission of the light emitting element 13 changes the resistance of the light receiving element 9, thus changing the target voltage Vm.

When the load increases through such control, the target voltage Vm becomes higher and the ON duration of the switching element 3 becomes longer.

The target voltage Vm is supplied to the oscillator 1 via a switch 15. When the target voltage Vm becomes lower, the oscillation frequency of the oscillator 1 becomes lower.

A comparator 14 compares the target voltage Vm with a reference value Vb.

When the load becomes lighter and the target voltage Vm becomes lower, the output of the comparator 14 goes to a low level (hereinafter referred to as "L") from a high level (hereinafter referred to as "H"), switching on the switch 15 which is switched on in response to an "L" signal.

When the switch 15 is switched on, the target voltage Vm is input to the oscillator 1. Accordingly, the oscillation frequency of the oscillator 1 is lowered, so that the normal mode is changed to the low frequency operation mode.

To prevent the mode from returning to the normal mode due to noise or the like immediately after the mode is changed to the low frequency operation mode, the output of the comparator 14 may be given a hysteresis characteristic by changing the reference value Vb in two levels.

FIG. 8 is a structural diagram showing one example of a switching power source device which performs an intermittent switching operation, and uses the same reference numerals as used in FIG. 7 to denote like or same components.

In the switching power source device, the output terminal of the flip-flop 2 is connected to one input terminal of an AND gate 20.

The output terminal of the AND gate 20 is connected to the switching element 3.

The other input terminal of the AND gate 20 is connected to the output terminal of the comparator 14, and is supplied with an "H" signal when the switching power source device is activated.

After activation, the flip-flop 2 is set in synchronism with the oscillation of the oscillator 1.

When the flip-flop 2 is set, the output signal of the AND gate 20 becomes "H". The switching element 3 is switched on in response to the "H" signal, causing the switching current to flow to the primary winding of the transformer 4.

The resistor 5 generates a voltage corresponding to the switching current.

The comparator 6 resets the flip-flop 2 when the voltage generated by the resistor 5 exceeds the target voltage Vm.

The target voltage Vm is the reference voltage ES1, generated by the reference voltage source 7, divided by the resistance of the resistor 8 and the resistance of the light receiving element 9 of the photocoupler.

When the flip-flop 2 is reset, the output signal of the AND gate 20 goes to "L", switching off the switching element 3.

Accordingly, the energy stored in the transformer 4 is supplied to the load by the diode 10 and the capacitor 11.

The output-voltage detection circuit 12 detects the difference between the output voltage and the predetermined value. The light emitting element 13 of the photocoupler emits light according to the difference.

The emission of the light emitting element 13 changes the resistance of the light receiving element 9, thus changing the target voltage Vm.

When the load increases through such control, the target voltage Vm becomes higher and the ON duration of the switching element 3 becomes longer.

The comparator 14 compares the target voltage Vm with the reference value Vb.

When the load becomes lighter and the target voltage Vm becomes lower, the output of the comparator 14 goes to an "L" from an "H".

Accordingly, the AND gate 20 outputs an "L" signal regardless of the output signal of the flip-flop 2, stopping the switching of the switching element 3.

That is, the normal mode is switched to a standby mode.

According to the switching power source devices in FIGS. 7 and 8, even with a constant load, when an input voltage Vin from the power source 18 becomes higher, the target voltage Vm becomes lower, whereas the input voltage Vin becomes lower, the target voltage Vm becomes higher.

According to the switching power source devices in FIGS. 7 and 8, the peak value of a switching current i theoretically becomes constant irrespective of whether the input voltage Vin is high or low for the following reason. Because energy $\epsilon$ per single switching is given by $$=\tfrac{1}{2} \times L \times i^2,$$

output power Po under PWM control of a fixed frequency f in critical mode becomes $$Po = \epsilon \times f.$$

In the actual switching circuit, however, a noise preventing filter (not shown) and the comparator 6 suffer a detection delay. When the input voltage Vin is high, the inclination of the switching current becomes sharp, whereas when the input voltage Vin is low, the inclination of the switching current becomes gentle. That is, the detection time varies.

Therefore, the target voltage Vm becomes a value having the detection delay absorbed by a feedback circuit, and becomes low when the input voltage Vin is high, and becomes high when the input voltage Vin is low.

As the reference value Vb for determining whether the mode should go to the low frequency operation mode or the standby mode is constant, a load current Io at the mode transition to the low frequency operation mode or the standby mode becomes large when the input voltage Vin is high, and becomes small when the input voltage Vin is low.

When the mode is switched to the low frequency operation mode or the standby mode with the input voltage Vin being high, therefore, the switching energy is high, which may generate noise. If the switching power source device is so set as to prevent generation of noise, the mode is not switched to the low frequency operation mode or the standby mode when the input voltage Vin is low. In this case, power consumption under a light load cannot be reduced.

SUMMARY OF THE INVENTION

Accordingly, it is an object of the present invention to provide a switching power source device capable of reducing power consumption regardless of a variation in input voltage.

It is another object of the invention to provide a switching power source device capable of stably suppressing power consumption under a light load.

To achieve the objects, a switching power source device according to the first aspect of the invention comprises:
a power source;
an inductor;
a switching element that performs a switching operation, and, when switched on, connects the inductor to the power source to let a switching current flow to the inductor;
a transformer that transforms energy stored in the inductor as the switching current flows through the transformer, and supplies the transformed energy to a load;
a detector that detects a status of the load;
a mode switching unit that sets a low power-consumption operation mode by setting a frequency at which the switching element is switched on lower than a frequency in a normal mode or stopping the switching element from being switched on, when the detector detects that the load is lighter than a predetermined value; and
an ON-duration adjusting unit that changes an ON duration of the switching element at a transition from the normal mode to the low power-consumption operation mode according to an input voltage from the power source.

In this case, the ON-duration adjusting unit may change the ON duration of the switching element in such a way that the ON duration of the switching element becomes shorter when the input voltage is high than when the input voltage is low.

To achieve the objects, a switching power source device according to the second aspect of the invention comprises:
a power source;
an inductor;
a switching element that performs a switching operation, and, when switched on, connects the inductor to the power source to let a switching current flow to the inductor;
a transformer that transforms energy stored in the inductor as the switching current flows through the transformer, and supplies the transformed energy to a load;
a detector that detects a status of the load;
a mode switching unit that sets a low power-consumption operation mode by setting a frequency at which the switching element is switched on lower than a frequency in a normal mode or stopping the switching element from being switched on, when the detector detects that the load is lighter than a predetermined value; and
a switching-current adjusting unit that changes the switching current at a transition from the normal mode to the low power-consumption operation mode according to an input voltage from the power source.

In this case, the switching-current adjusting unit may change the switching current in such a way that the switching current becomes smaller when the input voltage is high than when the input voltage is low.

To achieve the objects, a switching power source device according to the third aspect of the invention comprises:
a power source;
an inductor;
a switching element that performs a switching operation, and, when switched on, connects the inductor to the power source to let a switching current flow to the inductor;
a transformer that transforms energy stored in the inductor as the switching current flows through the transformer, and supplies the transformed energy to a load;
a detector that detects a status of the load;
a mode switching unit that sets a low power-consumption operation mode by setting a frequency at which the switching element is switched on lower than a frequency in a normal mode or stopping the switching element from being switched on, when the detector detects that the load is lighter than a predetermined value; and
a unit that makes constant energy stored in the inductor by single switching of the switching element at a transition from the normal mode to the low power-consumption operation mode, irrespective of a value of an input voltage supplied from the power source.

The invention can efficiently reduce power consumption in low power-consumption operation mode

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Preferred embodiments of the present invention will be described below with reference to the accompanying drawings.

First Embodiment

Figure 1:
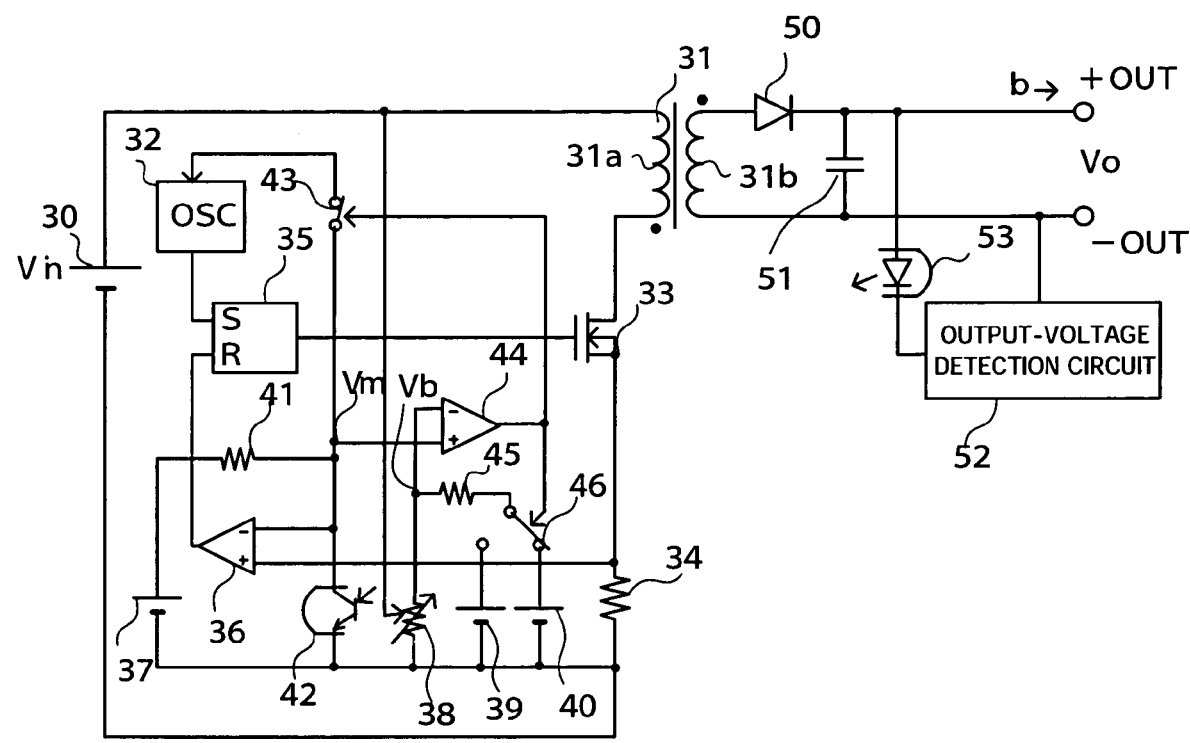
FIG. 1 is a circuit diagram of a switching power source device according to a first embodiment of the present invention.

FIG. 1 is a circuit diagram of a switching power source device according to the first embodiment of the invention.

The switching power source (switched-mode power source) device is a DC-DC converter. The switching power source device comprises a power source 30, a transformer 31, an oscillator 32, and an N channel MOS transistor (hereinafter called "NMOS") 33 as a switching element.

The primary winding, 31a, of the transformer 31 is an inductor through which a switching current flows.

One end of the primary winding 31a of the transformer 31 is connected to the positive electrode of the power source 30. The other end of the primary winding 31a is connected to the drain of the NMOS 33. The source of the NMOS 33 is connected to one end of a resistor 34 whose other end is connected to the negative electrode of the power source 30.

The output terminal of the oscillator 32 is connected to a set terminal (S) of a reset-set flip-flop (hereinafter called "RS-FF") 35. The output terminal of the RS-FF 35 is connected to the gate of the NMOS 33.

One end of the resistor 34 is connected to one input terminal (+) of a comparator 36. The other end of the resistor 34 is connected to the negative electrode of a reference voltage source 37, one end of a variable resistor 38, the negative electrode of a reference voltage source 39, and the negative electrode of a reference voltage source 40.

One end of a resistor 41 is connected to the positive electrode of the reference voltage source 37. The other end of the resistor 41 is connected to the other input terminal (−) of the comparator 36, one end of a switch 43, and one input terminal (+) of a comparator 44, and is further connected to the other end of the resistor 34 via a light receiving element 42 of a photocoupler. The output terminal of the comparator 36 is connected to a reset terminal (R) of the RS-FF 35.

The other end of the switch 43 is connected to the oscillator 32. The oscillator 32 oscillates on a frequency according to a voltage supplied via the switch 43.

The variable resistor 38 changes its resistance according to an input voltage Vin given from the power source 30. The resistance becomes low when the input voltage Vin is high, and becomes high when the input voltage Vin is low.

The other end of the variable resistor 38 is connected to one end of a resistor 45, and the other input terminal (−) of the comparator 44. The output terminal of the comparator 44 is connected to the switch 43 and a switch 46.

One end of the switch 46 is connected to the other end of the resistor 45. The switch 46 is a changeover switch which connects the resistor 45 to the positive electrode of the reference voltage source 40 when the output of the comparator 44 is "L" and connects the resistor 45 to the positive electrode of the reference voltage source 39 when the output of the comparator 44 is "H". The switch 43 connects a node between the resistor 41 and the light receiving element 42 to the oscillator 32 when the output of the comparator 44 is "L" and disconnects the node between the resistor 41 and the light receiving element 42 from the oscillator 32 when the output of the comparator 44 is "H".

The anode of a diode 50 is connected to one end of the secondary winding 31b of the transformer 31. The cathode of the diode 50 is connected to one electrode of a capacitor 51 and an output terminal +OUT. The other end of the secondary winding 31b is connected to the other electrode of the capacitor 51 and an output terminal −OUT. An output-voltage detection circuit 52 is connected between the output terminal +OUT and the output terminal −OUT. A light emitting element 53 of the photocoupler is connected to the output-voltage detection circuit 52.

The operation of the switching power source device in FIG. 1 will be described below.

When the oscillator 32 oscillates and outputs an "H" signal, the RS-FF 35 is set in synchronism with the signal output. The set RS-FF 35 outputs an "H" signal which turns on the NMOS 33. The ON action of the NMOS 33 causes the switching current to flow to the primary winding 31a of the transformer 31 in which energy is stored.

A voltage corresponding to the switching current is generated across the resistor 34. The comparator 36 resets the RS-FF 35 when the voltage across the resistor 34 exceeds a target voltage Vm. The target voltage Vm is a reference voltage ES1, generated by the reference voltage source 37, divided by the resistance of the resistor 41 and the resistance of the photocoupler's light receiving element 42.

As the RS-FF 35 is reset, the NMOS 33 is turned off, causing the energy stored in the transformer 31 to be converted to a DC voltage by the diode 50 and the capacitor 51. The DC voltage is supplied to a load. The output-voltage detection circuit 52 detects a difference between the output voltage and a predetermined value, and the photocoupler's light emitting element 53 emits light according to the difference. The emission of the light emitting element 53 changes the resistance of the photocoupler's light receiving element 42, thereby changing the target voltage Vm.

When the load becomes greater through such control, the target voltage Vm becomes higher, and the ON duration or the ON width of the NMOS 33 becomes longer. The target voltage Vm is supplied to the oscillator 32 via the switch 43. When the target voltage Vm becomes lower, the oscillation frequency of the oscillator 32 becomes lower. The above operation makes an output voltage Vo constant.

The comparator 44 compares the target voltage Vm with the reference value Vb. When the switch 46 connects the resistor 45 to the reference voltage source 40, the reference value Vb is the voltage generated by the reference voltage source 40, divided by the resistance of the resistor 45 and the resistance of the variable resistor 38. In normal mode, the target voltage Vm is higher than the reference value Vb.

When the load becomes lighter, the resistance of the light receiving element 42 decreases, and the target voltage Vm becomes lower. When the target voltage Vm drops to the reference value Vb or lower, the output level of the comparator 44 changes to "L" from "H", thus turning on the switch 43. When the switch 43 is switched on, the target voltage Vm is input to the oscillator 32, thus lowering the oscillation frequency of the oscillator 32. As a result, the normal mode is switched to the low frequency operation mode (low power-consumption operation mode). When the output level of the comparator 44 goes to "L", the switch 46 connects the resistor 45 to the positive electrode of the reference voltage source 39. Accordingly, the hysteresis is set to suppress the transition to the normal mode from the low frequency operation mode, improving the stability at the time of mode switching. In low frequency operation mode, the switching frequency becomes lower, thus reducing power consumption.

The advantages of the switching power source device will now be explained in comparison with the conventional switching power source devices.

Figure 2:
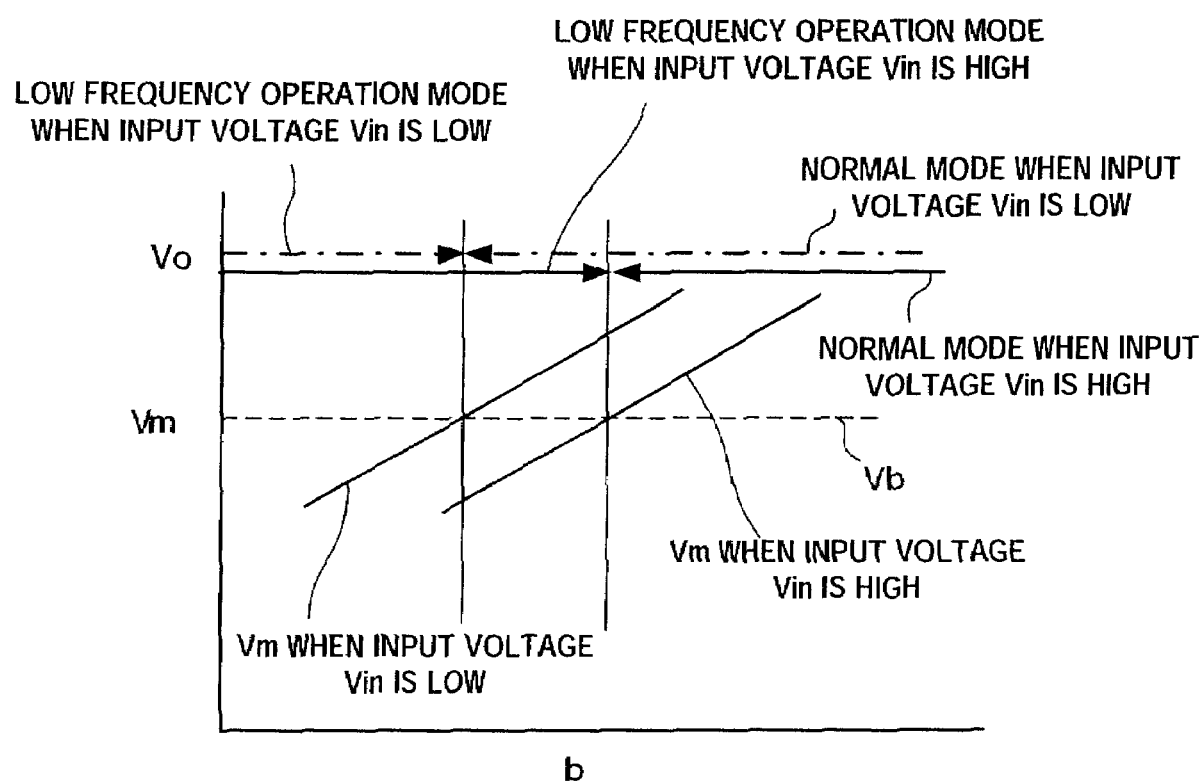
FIG. 2 is an explanatory diagram for explaining the problem of the conventional switching power source device in FIG. 7.
Figure 7:
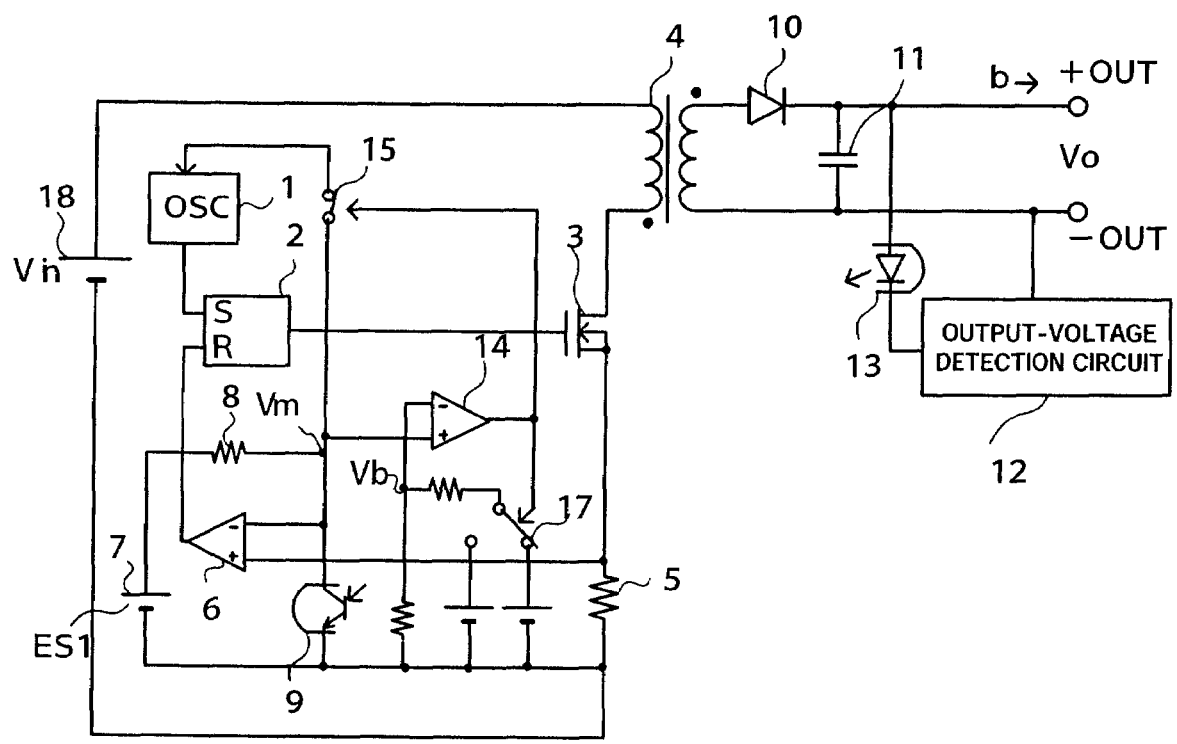
FIG. 7 is a circuit diagram of the conventional switching power source device having a low frequency operation mode.

FIG. 2 is an explanatory diagram for explaining the problem of the conventional switching power source device in FIG. 7.

In the switching power source device in FIG. 7, even with a constant load, when the input voltage Vin from the power source becomes higher, the target voltage Vm becomes lower, and when the input voltage Vin becomes lower, the target voltage Vm becomes higher. Since the reference value Vb based on which whether or not to go to the low frequency operation mode is determined is constant, the load current Io at the transition to the low frequency operation mode becomes large when the input voltage Vin is high, and becomes small when the input voltage Vin is low. When the mode is changed to the low frequency operation mode on the high input voltage Vin, the switching energy is high, which may generate intolerable noise.

It is desirable that the oscillation frequency in low frequency operation mode be as low as possible to reduce the switching loss. Recently, the oscillation frequency is reduced to several hundred Hz to several kilo Hz. The frequency is an audible frequency. If the energy per single switching at the audible frequency is large, noise is generated from the parts of the transformer 4 or the like.

Even in low frequency operation mode, slight power needs to be consumed to keep the standby mode. To reduce the power consumption, it is better to perform switching at as low a frequency as possible. When the switching power source device operates on a large switching current at a low frequency, the energy per single switching becomes large, making noise larger. It is therefore necessary to set the peak value of the switching current of the switching element 3 in low frequency operation mode to the minimum value to suppress noise to the tolerable level.

It is not however so easy to adequately set the peak value of the switching current. In the switching power source device in FIG. 7, when the input voltage Vin changes, the target voltage Vm changes, and the load current Io which flows across the load when the mode is changed to the low frequency operation mode also changes as shown in FIG. 2. It is apparent that when the input voltage Vin becomes higher, the load current Io increases, whereas when the input voltage Vin becomes lower, the load current Io decreases.

In case where the efficiency is improved by setting the peak value of the switching current in such a way that switching is performed at a low frequency under a specific load condition, the setting should be done on the assumption of the low input voltage Vin, so that the mode can surely be changed to the low frequency operation mode. With such setting done, when the input voltage Vin becomes high, the load current Io at the transition between the normal mode and the low frequency operation mode becomes large, undesirably making noise larger. If the peak value of the switching current at the transition between the normal mode and the low frequency operation mode is set in such a way that noise does not matter when the input voltage Vin is high even at the maximum level, the mode may not be changed to the low frequency operation mode when the input voltage Vin is low even with the same load current Io, thus disabling reduction of the power consumption.

Figure 3:
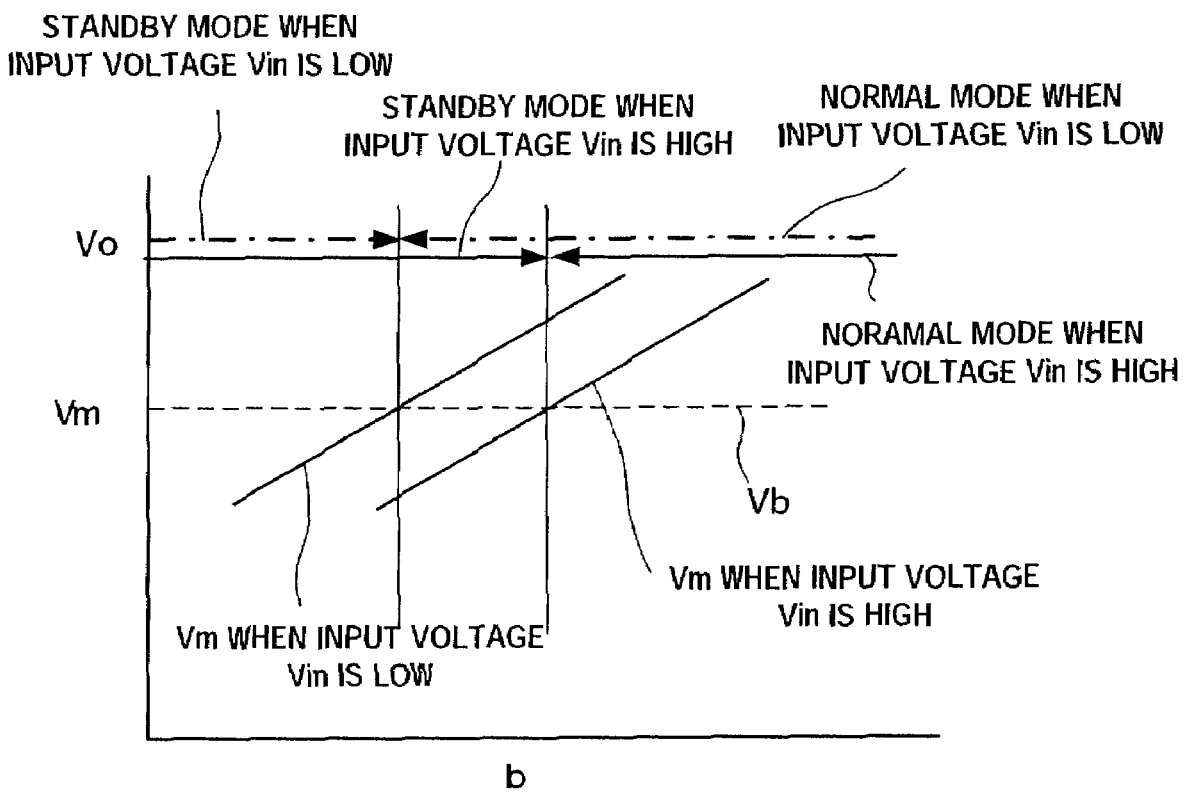
FIG. 3 is an explanatory diagram for explaining the problem of the conventional switching power source device in FIG. 8.
Figure 8:
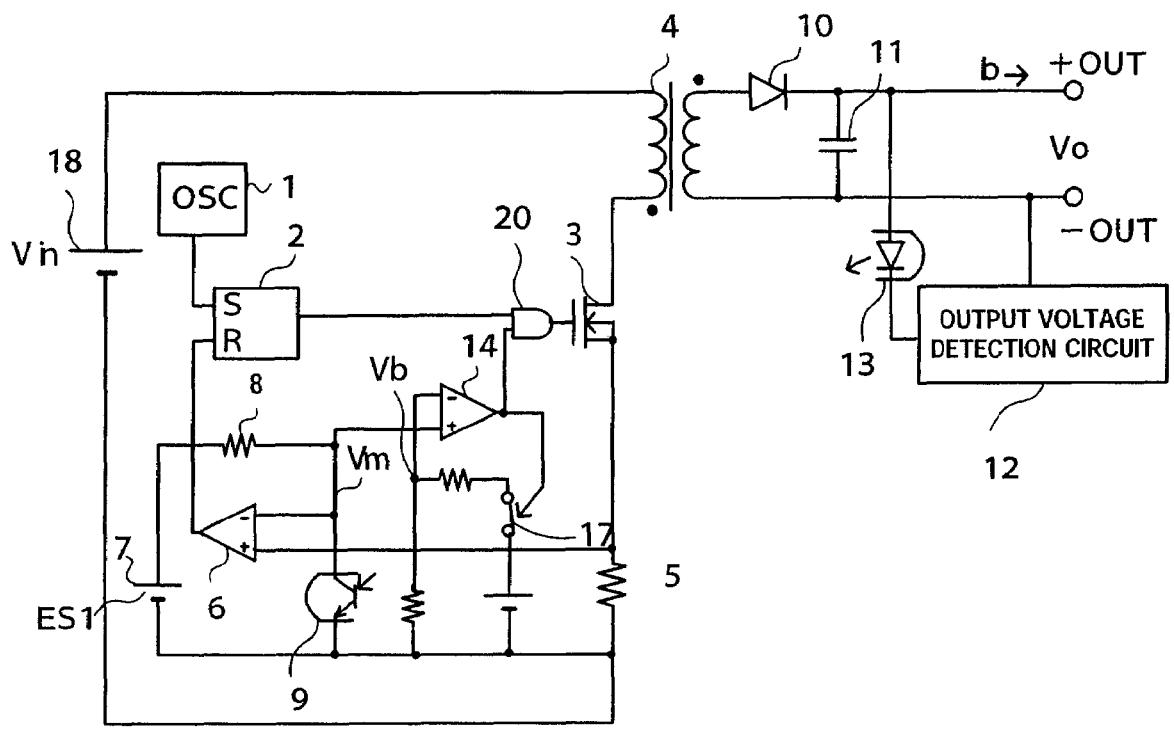
FIG. 8 is a circuit diagram of the conventional switching power source device which performs an intermittent switching operation.

FIG. 3 is an explanatory diagram for explaining the problem of the conventional switching power source device in FIG. 8.

In the switching power source device in FIG. 8, even with a constant load, when the input voltage Vin from the power source becomes higher, the target voltage Vm becomes lower, and when the input voltage Vin becomes lower, the target voltage Vm becomes higher. Since the reference value Vb based on which whether or not to go to the standby mode is determined is constant, the load current Io at the transition to the standby mode becomes large when the input voltage Vin is high, and becomes small when the input voltage Vin is low. When the mode is changed to the standby mode on the high input voltage Vin, the switching energy is high, which may generate intolerable noise.

It is desirable that the switching frequency be as low as possible to reduce the switching loss, even when switching is done with the standby mode taken between switching actions. Recently, the switching frequency at which switching is done with the standby mode taken between switching actions is reduced to several hundred Hz to several kilo Hz. The frequency is an audible frequency. If the energy per single switching at the audible frequency is large, noise is generated from the parts of the transformer 4 or the like.

To reduce the power consumption, it is better to perform switching at as low a frequency as possible. When switching is performed on a large switching current at a low frequency, the energy per single switching becomes large, making noise larger. Therefore, the peak value of the switching current of the switching element 3 when switching is done with the standby mode taken between switching actions needs to be set to the minimum value to suppress noise to the tolerable level.

It is not however so easy to adequately set the peak value of the switching current. In the switching power source device in FIG. 8, like the switching power source device in FIG. 7, when the input voltage Vin changes, the target voltage Vm changes, and the load current Io which flows across the load when the mode is changed to the standby mode also changes as shown in FIG. 3. It is apparent that when the input voltage Vin becomes higher, the load current Io increases, whereas when the input voltage Vin becomes lower, the load current Io decreases.

In case where the efficiency is improved by setting the peak value of the switching current in such a way that switching is performed at a low frequency under a specific load condition, the setting should be done on the assumption of the low input voltage Vin, so that the mode can surely be changed to the standby mode. With such setting done, when the input voltage Vin becomes high, the load current Io at the transition between the normal mode and the standby mode becomes large, undesirably making noise larger. If the peak value of the switching current at the transition between the normal mode and the standby mode is set in such a way that noise does not matter when the input voltage Vin is high even at the maximum level, the mode may not be changed to the standby mode when the input voltage Vin is low even with the same load current Io, thus disabling reduction of the power consumption.

Figure 4:
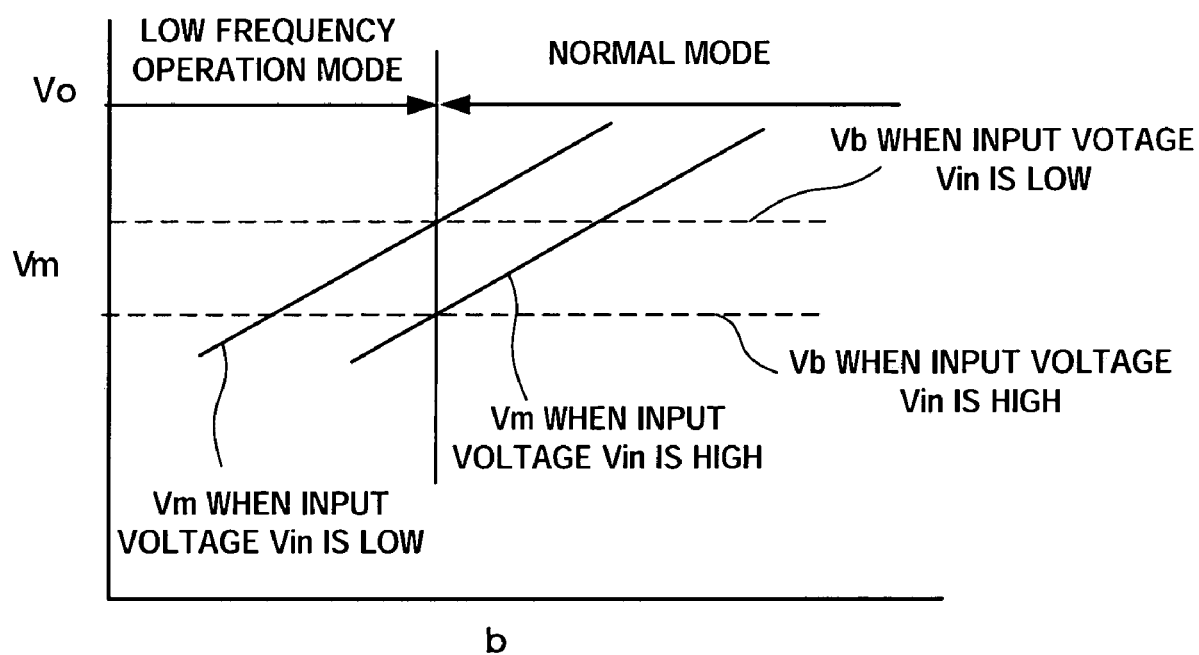
FIG. 4 is an explanatory diagram for explaining the advantages of the switching power source device in FIG. 1.

FIG. 4 is an explanatory diagram for explaining the advantages of the switching power source device in FIG. 1.

In the switching power source device in FIG. 1 according to the embodiment, even if the target voltage Vm increases due to an increase in input voltage Vin from the power source 30, the resistance of the variable resistor 38 decreases. That is, the reference value Vb to be compared with the target voltage Vm drops as shown in FIG. 4, and the target voltage Vm when the mode is changed between the normal mode and the low frequency operation mode becomes lower. This reduces the peak value of the switching current when the mode is changed between the normal mode and the low frequency-operation mode. Accordingly, the load current Io when the mode is changed between the normal mode and the low frequency operation mode becomes approximately constant. So does the switching energy. It is therefore possible to suppress noise irrespective of the input voltage Vin. With the same load current, the efficiency of low power consumption does not change significantly irrespective of the input voltage Vin.

Second Embodiment

Figure 5:
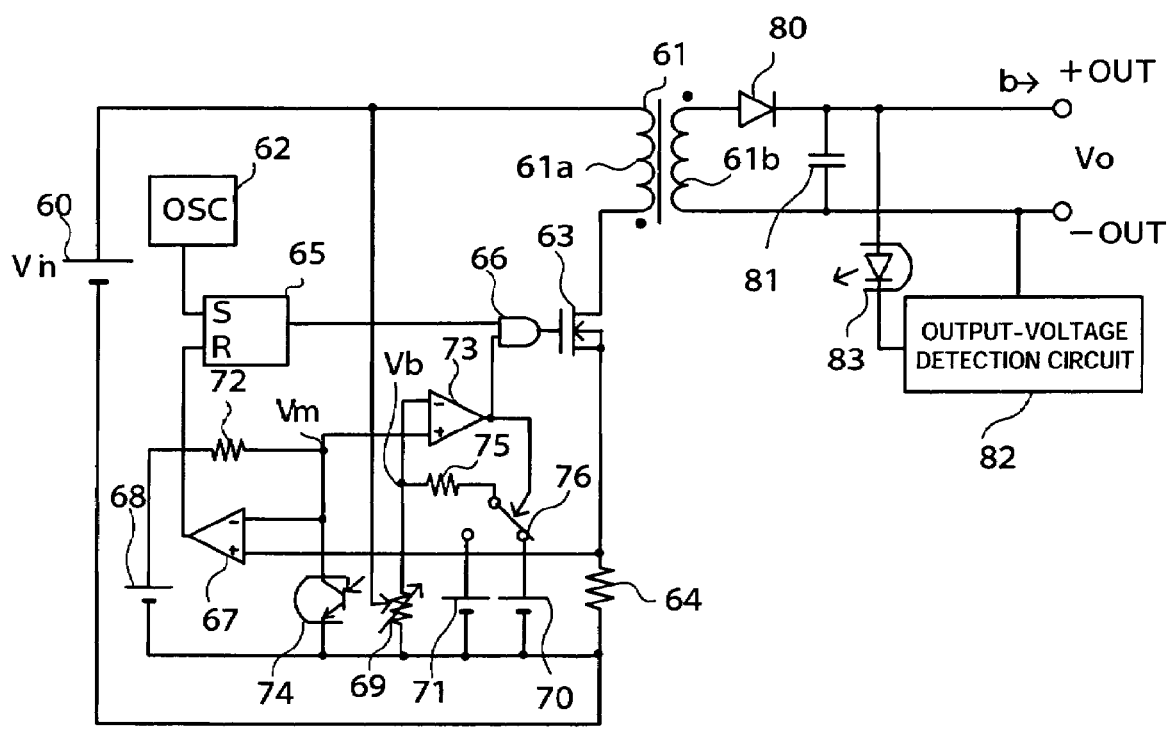
FIG. 5 is a circuit diagram of a switching power source device according to a second embodiment of the invention.

FIG. 5 is a circuit diagram of a switching power source device according to the second embodiment of the invention.

The switching power source device is a DC-DC converter, and comprises a power source 60, a transformer 61 whose primary winding 61a has one end connected to the positive electrode of the power source 60, an oscillator 62, and an NMOS 63 as a switching element.

The primary winding 61a of the transformer 61 is an inductor through which a switching current flows. The drain of the NMOS 63 is connected to the other end of the primary winding 61a. The source of the NMOS 63 is connected to one end of a resistor 64 whose other end is connected to the negative electrode of the power source 60.

The output terminal of the oscillator 62 is connected to a set terminal (S) of an RS-FF 65. The output terminal of the RS-FF 65 is connected to one input terminal of an AND gate 66 whose output terminal is connected to the gate of the NMOS 63.

One end of the resistor 64 is connected to one input terminal (+) of a comparator 67. The other end of the resistor 64 is connected to the negative electrode of a reference voltage source 68, one end of a variable resistor 69, the negative electrode of a reference voltage source 70, and the negative electrode of a reference voltage source 71.

One end of a resistor 72 is connected to the positive electrode of the reference voltage source 68. The other end of the resistor 72 is connected to the other input terminal (−) of the comparator 67, and one input terminal (+) of a comparator 73, and is further connected to the other end of the resistor 64 via a light receiving element 74 of a photocoupler. The output terminal of the comparator 67 is connected to a reset terminal (R) of the RS-FF 65.

The variable resistor 69 changes its resistance according to an input voltage Vin given from the power source 60. The resistance becomes low when the input voltage Vin is high, and becomes high when the input voltage Vin is low. The other end of the variable resistor 69 is connected to one end of a resistor 75, and the other input terminal (−) of the comparator 73. The output terminal of the comparator 73 is connected to the other input terminal of the AND gate 66 and a switch 76.

The switch 76 is a changeover switch which connects the resistor 75 to the positive electrode of the reference voltage source 70 when the output of the comparator 73 is "L" and connects the resistor 75 to the positive electrode of the reference voltage source 71 when the output of the comparator 73 is "H".

The anode of a diode 80 is connected to one end of the secondary winding 61b of the transformer 61. The cathode of the diode 80 is connected to one electrode of a capacitor 81 and an output terminal +OUT. The other end of the secondary winding 61b is connected to the other electrode of the capacitor 81 and an output terminal −OUT. An output-voltage detection circuit 82 is connected between the output terminal +OUT and the output terminal −OUT. A light emitting element 83 of the photocoupler is connected to the output-voltage detection circuit 82.

The operation of the switching power source device in FIG. 5 will be described below.

In the switching power source device, the other input terminal of the AND gate 66 is connected to the output terminal of the comparator 73, and is supplied with "H" when the switching power source device is activated.

When the oscillator 62 oscillates after activation, and outputs an "H" signal, the RS-FF 65 is set in synchronism with the signal output. When the RS-FF 65 is set, the output signal of the AND gate 66 becomes "H", turning on the NMOS 63. The ON action of the NMOS 63 causes the switching current to flow to the primary winding 61a of the transformer 61. A voltage corresponding to the switching current is generated across the resistor 64.

The comparator 67 resets the RS-FF 65 when the voltage generated across the resistor 64 exceeds a target voltage Vm. The target voltage Vm is a reference voltage generated by the reference voltage source 68, divided by the resistance of the resistor 72 and the resistance of the photocoupler's light receiving element 74.

As the RS-FF 65 is reset, the output signal of the AND gate 66 goes to "L", turning off the NMOS 63. As a result, the energy stored in the transformer 61 is supplied to the load via the diode 80 and the capacitor 81. The output-voltage detection circuit 82 detects a difference between the output voltage and a predetermined value, and the photocoupler's light emitting element 83 emits light according to the difference. The emission of the light emitting element 83 changes the resistance of the light receiving element 74, thereby changing the target voltage Vm. When the load becomes greater through such control, the target voltage Vm becomes higher, and the ON width of the NMOS 63 becomes longer.

The comparator 73 compares the target voltage Vm with the reference value Vb. When the switch 76 connects the resistor 75 to the reference voltage source 70, the reference value Vb is the voltage generated by the reference voltage source 70, divided by the resistance of the resistor 75 and the resistance of the variable resistor 69. In normal mode, the target voltage Vm is higher than the reference value Vb.

When the load becomes lighter, the resistance of the light receiving element 74 decreases, and the target voltage Vm becomes lower. When the target voltage Vm drops to the reference value Vb or lower, the output level of the comparator 73 changes to "L" from "H".

Accordingly, the AND gate 66 outputs an "L" signal regardless of the output signal of the RS-FF 65, stopping the switching of the NMOS 63. That is, the normal mode is switched to the standby mode (low power-consumption operation mode).

The advantages of the switching power source device according to the embodiment will be described next.

Figure 6:
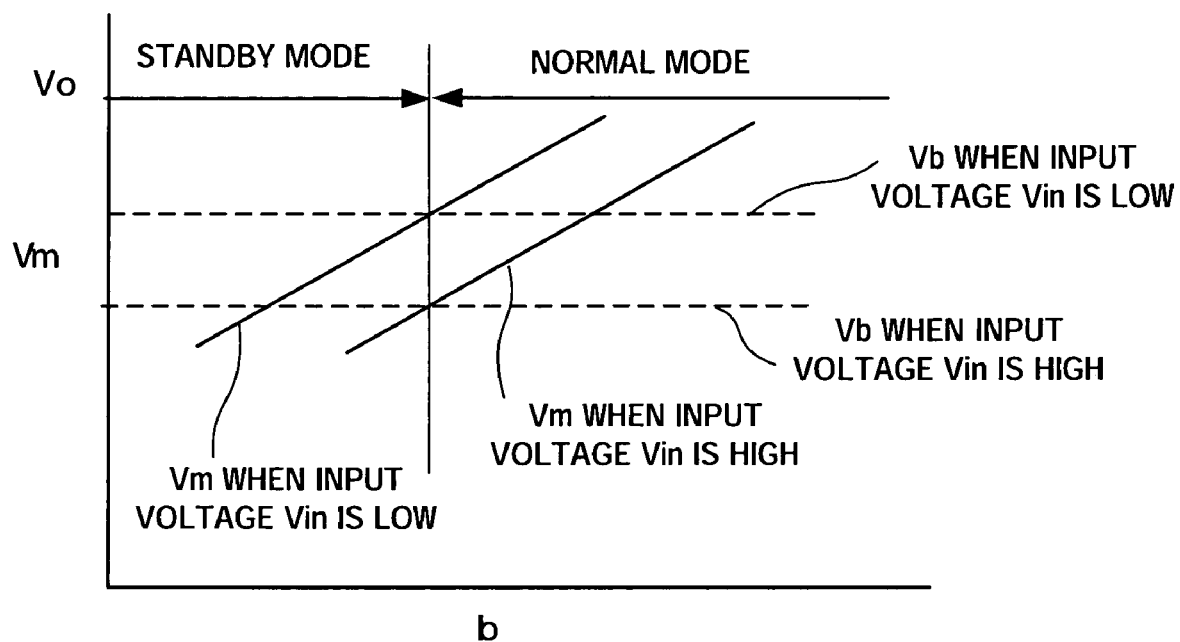
FIG. 6 is an explanatory diagram for explaining the advantages of the switching power source device in FIG. 5.

FIG. 6 is an explanatory diagram for explaining the advantages of the switching power source device in FIG. 5.

In the switching power source device in FIG. 5 according to the embodiment, even if the target voltage Vm drops due to an increase in input voltage Vin from the power source 60, the resistance of the variable resistor 69 decreases. That is, the reference value Vb to be compared with the target voltage Vm drops as shown in FIG. 6, and the target voltage Vm at the transition between the normal mode and the standby mode becomes lower, thus shortening the ON width at the transition between the normal mode and the standby mode. Accordingly, the load current Io when the mode is changed between the normal mode and the low frequency operation mode becomes approximately constant. So does the switching energy. It is therefore possible to suppress noise irrespective of the input voltage Vin. With the same load current, the efficiency of low power consumption does not change significantly irrespective of the input voltage Vin.

The invention is not limited to the embodiments described above, but may be modified in various forms.

For example, although the first embodiment or the second embodiment has the variable resistor 38 or 69 and changes the ON width of the switching element at the transition from the normal mode to the low frequency operation mode or the standby mode according to the input voltage Vin, the switching current may be made smaller as the input voltage Vin increases. Specifically, the variable resistor 38 or 69 may be replaced with a resistor whose resistance is not variable, and the resistor 34 or 64 may be replaced with a resistor whose resistance increases as the input voltage Vin increases. This modification demonstrates advantages similar to those of the first and second embodiments.

The switching power source device may also be configured in such a way that as the input voltage Vin increases, the switching current becomes smaller and the ON width becomes shorter, so that the switching energy is made constant irrespective of the input voltage Vin.

Although the AND gate 66 is inserted between the RS-FF 65 and the NMOS 63 in FIG. 5, the AND gate 66 may be inserted between the oscillator 62 and the RS-FF 65.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2004-336307 filed on Nov. 19, 2004 and including specification, claims, drawings and summary. The disclosure of the above Japanese Patent Application is incorporated herein by reference in its entirety.

What is claimed is:

1. A switching power source device comprising:
a power source;
an inductor;
a switching element that performs a switching operation, and, when switched on, connects said inductor to said power source to let a switching current flow to said inductor;
a transformer that transforms energy stored in said inductor as said switching current flows through said transformer, and supplies said transformed energy to a load;
a detector that detects a status of said load;
a mode switching unit that sets a low power-consumption operation mode by setting a frequency at which said switching element is switched on lower than a frequency in a normal mode or stopping said switching element from being switched on, when said detector detects that said load is lighter than a predetermined reference value; and
an ON-duration adjusting unit that changes an ON duration of said switching element according to an input voltage from said power source by changing in said reference value according to said input voltage from said power source, in such a way that a load current flowing to said load is constant at a transition from said normal mode to said low power-consumption operation mode, irrespective of a value of said input voltage from said power source.

2. The switching power source device according to claim 1, wherein said ON-duration adjusting unit changes said ON duration of said switching element in such a way that said ON duration of said switching element becomes shorter when said input voltage is high than when said input voltage is low.

3. A switching power source device comprising:
a power source;
an inductor;
a switching element that performs a switching operation, and, when switched on, connects said inductor to said power source to let a switching current flow to said inductor;
a transformer that transforms energy stored in said inductor as said switching current flows through said transformer, and supplies said transformed energy to a load;
a detector that detects a status of said load;
a mode switching unit that sets a low power-consumption operation mode by setting a frequency at which said switching element is switched on lower than a frequency in a normal mode or stopping said switching element from being switched on, when said detector detects that said load is lighter than a predetermined reference value; and
a switching-current adjusting unit that changes said switching current according to an input voltage from said power source by changing in said reference value according to said input voltage from said power source, in such a way that a load current flowing to said load is constant at a transition from said normal mode to said low power-consumption operation mode, irrespective of a value of said input voltage from said power source.

4. The switching power source device according to claim 3, wherein said switching-current adjusting unit changes said switching current in such a way that said switching current becomes smaller when said input voltage is high than when said input voltage is low.

5. A switching power source device comprising:
a power source;
an inductor;
a switching element that performs a switching operation, and, when switched on, connects said inductor to said power source to let a switching current flow to said inductor;
a transformer that transforms energy stored in said inductor as said switching current flows through said transformer, and supplies said transformed energy to a load;
a detector that detects a status of said load;
a mode switching unit that sets a low power-consumption operation mode by setting a frequency at which said switching element is switched on lower than a frequency in a normal mode or stopping said switching element from being switched on, when said detector detects that said load is lighter than a predetermined reference value; and
a unit that changes said switching current and an ON duration of said switching element by changing said reference value according to an input voltage from said power source, in such a way that the amount of energy, stored in said inductor by single switching of said switching element, is constant at a transition from said normal mode to said low power-consumption operation mode, irrespective of a value of said input voltage supplied from said power source.

* * * * *

UNITED STATES PATENT AND TRADEMARK OFFICE
CERTIFICATE OF CORRECTION

PATENT NO.       : 7,639,516 B2                                                               Page 1 of 1
APPLICATION NO.  : 11/284986
DATED            : December 29, 2009
INVENTOR(S)      : Hiroshi Usui et al.

It is certified that error appears in the above-identified patent and that said Letters Patent is hereby corrected as shown below:

Claim 1 at Column 11, Line 58:

Please delete "changing in said" and add -- changing said --.

Claim 3 at Column 12, Line 26:

Please delete "changing in said" and add -- changing said --.

Signed and Sealed this

Twenty-third Day of February, 2010

David J. Kappos
*Director of the United States Patent and Trademark Office*